United States Patent
Lin et al.

(10) Patent No.: US 10,174,412 B2
(45) Date of Patent: Jan. 8, 2019

(54) METHODS FOR FORMING VERTICALLY CRACKED THERMAL BARRIER COATINGS AND ARTICLES INCLUDING VERTICALLY CRACKED THERMAL BARRIER COATINGS

(71) Applicant: GENERAL ELECTRIC COMPANY, Schenectady, NY (US)

(72) Inventors: Dechao Lin, Greer, SC (US); David Bucci, Simpsonville, SC (US)

(73) Assignee: GENERAL ELECTRIC COMPANY, Schnectady, NY (US)

( * ) Notice: Subject to any disclaimer, the term of this patent is extended or adjusted under 35 U.S.C. 154(b) by 146 days.

(21) Appl. No.: 15/368,161

(22) Filed: Dec. 2, 2016

(65) Prior Publication Data

US 2018/0155815 A1    Jun. 7, 2018

(51) Int. Cl.
*B23K 1/00*    (2006.01)
*C23C 4/18*    (2006.01)
(Continued)

(52) U.S. Cl.
CPC .................. *C23C 4/18* (2013.01); *B23K 9/04* (2013.01); *B23K 26/32* (2013.01); *B23K 31/003* (2013.01);
(Continued)

(58) Field of Classification Search
CPC ......... C23C 4/18; C23C 4/10; C23C 28/3455; C23C 28/345; C23C 28/3215;
(Continued)

(56) References Cited

U.S. PATENT DOCUMENTS 4,457,948 A * 7/1984 Ruckle .................... C04B 38/00
427/257
5,073,433 A    12/1991 Taylor
(Continued)

FOREIGN PATENT DOCUMENTS

CA    2451495 A1 * 12/2002 ............... C23C 4/18
JP    2010043351 A * 2/2010 ............... C23C 4/18

OTHER PUBLICATIONS

Partial European Search Report and Opinion issued in connection with corresponding EP Application No. 17204169.1 dated Apr. 20, 2018.

*Primary Examiner* — Kiley S Stoner
(74) *Attorney, Agent, or Firm* — McNees Wallace & Nurick LLC

(57) ABSTRACT

A method for forming a vertically cracked thermal barrier coating is disclosed including positioning an article relative to a heat source. The article includes a thermal barrier coating disposed on a first surface of a substrate, and the substrate includes a second surface distal across the substrate from the first surface. Heat is applied locally to at least one discrete portion of the second surface of the substrate. At least one vertical crack in the thermal barrier coating is formed disposed over the at least one discrete portion. An article is disclosed including a substrate and a vertically-cracked thermal barrier coating disposed on the substrate. The vertically cracked thermal barrier coating includes at least one vertical crack in the thermal barrier coating and at least one of a low density of less than 85% of a theoretical density for the thermal barrier coating and a selective crack distribution.

20 Claims, 2 Drawing Sheets

(51) Int. Cl.
  *B23K 9/04* (2006.01)
  *B23K 26/32* (2014.01)
  *C23C 24/04* (2006.01)
  *C23C 28/00* (2006.01)
  *C23C 4/11* (2016.01)
  *B23K 31/00* (2006.01)
  *C23C 4/10* (2016.01)
  *F01D 5/28* (2006.01)
  *B23K 101/00* (2006.01)
  *B23K 103/16* (2006.01)

(52) U.S. Cl.
  CPC ............. *C23C 4/10* (2013.01); *C23C 4/11* (2016.01); *C23C 24/04* (2013.01); *C23C 28/321* (2013.01); *C23C 28/3215* (2013.01); *C23C 28/345* (2013.01); *C23C 28/3455* (2013.01); *F01D 5/288* (2013.01); *B23K 2101/001* (2018.08); *B23K 2103/172* (2018.08); *F05D 2300/15* (2013.01)

(58) Field of Classification Search
  CPC ......... C23C 28/321; C23C 24/04; C23C 4/11; F01D 5/288; B23K 31/003; B23K 26/32; B23K 9/04; B23K 2103/172; B23K 2101/001; B23K 1/0018; F05D 2300/15
  USPC ............................ 228/119; 29/889.1–889.722
  See application file for complete search history.

(56) References Cited

U.S. PATENT DOCUMENTS

| | | | |
|---|---|---|---|
| 5,830,586 A | 11/1998 | Gray et al. | |
| 5,897,921 A | 4/1999 | Borom et al. | |
| 6,756,082 B1* | 6/2004 | Subramanian | C23C 14/083 427/248.1 |
| 8,007,246 B2* | 8/2011 | Rowe | C23C 4/02 416/241 B |
| 8,586,169 B2* | 11/2013 | Namba | C04B 35/486 106/286.2 |
| 2004/0156724 A1* | 8/2004 | Torigoe | C23C 4/18 416/241 R |
| 2005/0064213 A1* | 3/2005 | Subramanian | C23C 4/18 428/469 |
| 2005/0136249 A1* | 6/2005 | Arikawa | C23C 4/02 428/332 |
| 2005/0221109 A1* | 10/2005 | Torigoe | B32B 15/04 428/633 |
| 2007/0207328 A1* | 9/2007 | Frost | C23C 4/02 428/469 |
| 2009/0162632 A1* | 6/2009 | Kirby | C23C 30/00 428/304.4 |
| 2009/0176059 A1* | 7/2009 | Namba | C04B 35/486 428/155 |
| 2010/0224602 A1* | 9/2010 | Helmick | B23K 26/356 219/121.66 |
| 2011/0038710 A1* | 2/2011 | Kemppainen | F01D 5/288 415/115 |
| 2011/0044821 A1* | 2/2011 | Rowe | C23C 4/02 416/241 R |
| 2011/0086177 A1* | 4/2011 | Ma | C23C 4/129 427/446 |
| 2012/0273468 A1* | 11/2012 | Arjakine | C30B 13/24 219/76.12 |
| 2012/0276355 A1* | 11/2012 | Sansom | F41H 5/0421 428/218 |
| 2014/0193760 A1* | 7/2014 | Nelson | C23C 4/11 432/9 |
| 2014/0263579 A1* | 9/2014 | Kulkarni | F01D 11/122 228/119 |
| 2015/0307990 A1* | 10/2015 | Snyder | C23C 16/047 427/554 |
| 2016/0199941 A1* | 7/2016 | McDowell | B23K 26/389 219/121.71 |
| 2016/0199943 A1* | 7/2016 | Hu | B23K 26/16 219/121.71 |
| 2016/0199945 A1* | 7/2016 | McDowell | B23K 26/389 219/121.71 |
| 2016/0212360 A1* | 7/2016 | Williams | H04N 5/33 |
| 2016/0362989 A1* | 12/2016 | Subramanian | F01D 11/122 |
| 2016/0369637 A1* | 12/2016 | Subramanian | F01D 11/122 |
| 2017/0081753 A1* | 3/2017 | Zhang | C23C 4/134 |
| 2017/0107602 A1* | 4/2017 | Lau | C23C 4/11 |
| 2017/0137949 A1* | 5/2017 | Bahraini Hasani | C23C 4/08 |
| 2018/0050964 A1* | 2/2018 | McEvoy | F01D 5/288 |

* cited by examiner

METHODS FOR FORMING VERTICALLY CRACKED THERMAL BARRIER COATINGS AND ARTICLES INCLUDING VERTICALLY CRACKED THERMAL BARRIER COATINGS

FIELD OF THE INVENTION

The present invention is directed to methods for forming vertically cracked thermal barrier coatings and articles including vertically cracked thermal barrier coatings. More particularly, the present invention is directed to methods for forming vertically cracked thermal barrier coatings with locally applied heating, and articles including vertically cracked thermal barrier coatings wherein the vertically-cracked thermal barrier coating includes at least one of a low density and a selective crack distribution.

BACKGROUND OF THE INVENTION

Gas turbines for power generation systems must satisfy the highest demands with respect to reliability, power, efficiency, economy, and operating service life. Modern high-efficiency combustion turbines have firing temperatures that exceed about 2,300° F. (1,260° C.), and firing temperatures continue to increase as demand for more efficient engines continues. Many components that form the combustor and "hot gas path" turbine sections are directly exposed to aggressive hot combustion gases. The use of coatings on turbine components such as combustors, combustion liners, combustion transition pieces, combustion hardware, blades (buckets), vanes (nozzles) and shrouds is important in commercial gas turbine engines.

Coatings, such as thermal barrier coating systems, contribute to desirable performance characteristics and operating capabilities at elevated temperatures. Typical thermal barrier coating systems include a bond coat disposed on the substrate of the turbine component, and a thermally insulating top coating, referred to as the "thermal barrier coating," disposed on the bond coating. The bond coat provides oxidation and hot corrosion protection to the underlying substrate of the turbine component. Bond coat may also provide an interface for the thermal barrier coating to adhere.

U.S. Pat. No. 5,073,433 (the "'433 patent") discloses a thermal barrier coating having a density greater than 88% of the theoretical density with a plurality of vertical cracks homogeneously dispersed throughout the coating to improve its thermal fatigue resistance. The '433 patent discloses that if the density of the coating is less than 88% of the theoretical density, the formation of the cracks is effectively prevented. Hence, this coating type has become known as a dense, vertically-cracked ("DVT") thermal barrier coating. The '433 patent discloses forming the DVT thermal barrier coating by forming a monolayer having at least two superimposed splats having different temperatures, and cooling the monolayer and repeating the process to form the DVT thermal barrier coating.

However, the DVT thermal barrier coating of the '433 patent is difficult to produce, has a density which may be undesirable for certain applications, and may be subject to spallation under certain operating conditions. In addition, the process of the '433 patent does not permit formation of tailored regions of vertical cracking, and does not permit welding operations on the outer diameter of a combustion liner while the thermal barrier coating remains on the inner diameter of the combustion liner.

BRIEF DESCRIPTION OF THE INVENTION

In an exemplary embodiment, a method for forming a vertically cracked thermal barrier coating includes positioning an article relative to a heat source. The article includes a thermal barrier coating disposed on a first surface of a substrate, and the substrate includes a second surface distal across the substrate from the first surface. Heat is applied locally to at least one discrete portion of the second surface of the substrate. At least one vertical crack in the thermal barrier coating is formed disposed over the at least one discrete portion.

In another exemplary embodiment, a method for forming a vertically cracked thermal barrier coating on a turbine component includes positioning the turbine component relative to a welding device. The turbine component includes a thermal barrier coating disposed on a first surface of a substrate, and the substrate includes a second surface distal across the substrate from the first surface. At least one discrete portion of the second surface of the substrate is welded, producing weld shrinkage at the at least one discrete portion. At least one vertical crack in the thermal barrier coating disposed over the at least one discrete portion is formed by the weld shrinkage.

In another exemplary embodiment, an article includes a substrate and a vertically-cracked thermal barrier coating disposed on the substrate. The vertically cracked thermal barrier coating includes at least one vertical crack in the thermal barrier coating and a density of less than 85% of a theoretical density for the thermal barrier coating.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary heterogeneous compositions, articles comprising the heterogeneous compositions, and methods for forming the articles. Embodiments of the present disclosure, in comparison to articles and methods not utilizing one or more features disclosed herein, decrease costs, increase process efficiency, decrease spallation, increase coating durability, decrease process complexity, increase survivability of a thermal barrier coating one on surface of a substrate while the opposite surface of the substrate is being welded, increase cracking control, or a combination thereof.

Figure 1:
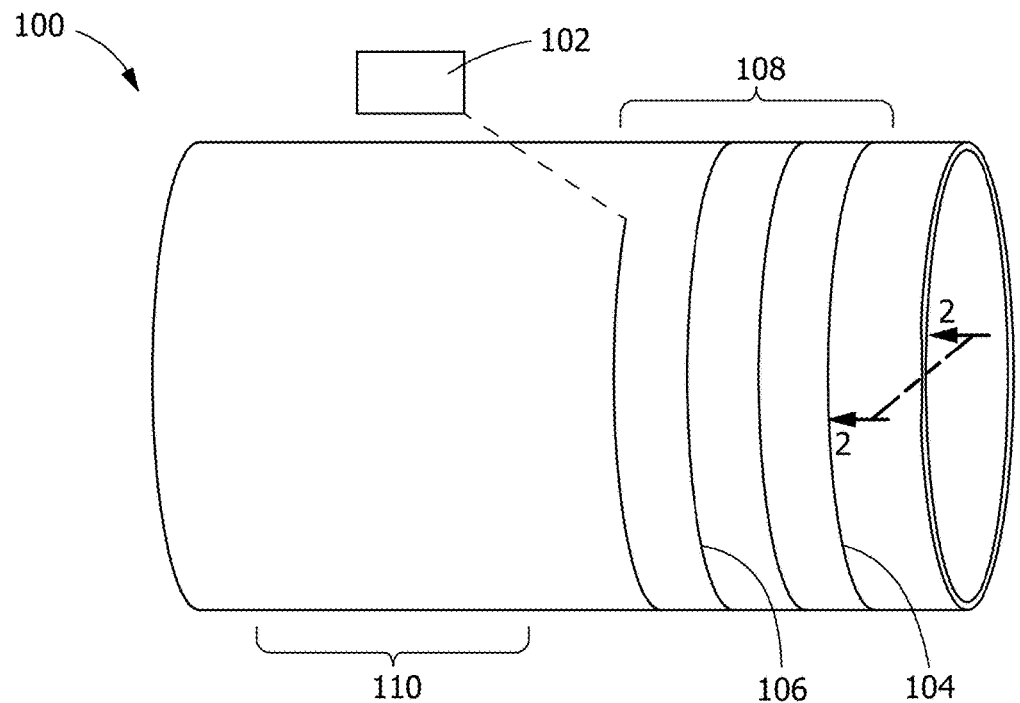
FIG. 1 is a perspective view of an article, according to an embodiment of the present disclosure.
Figure 2:
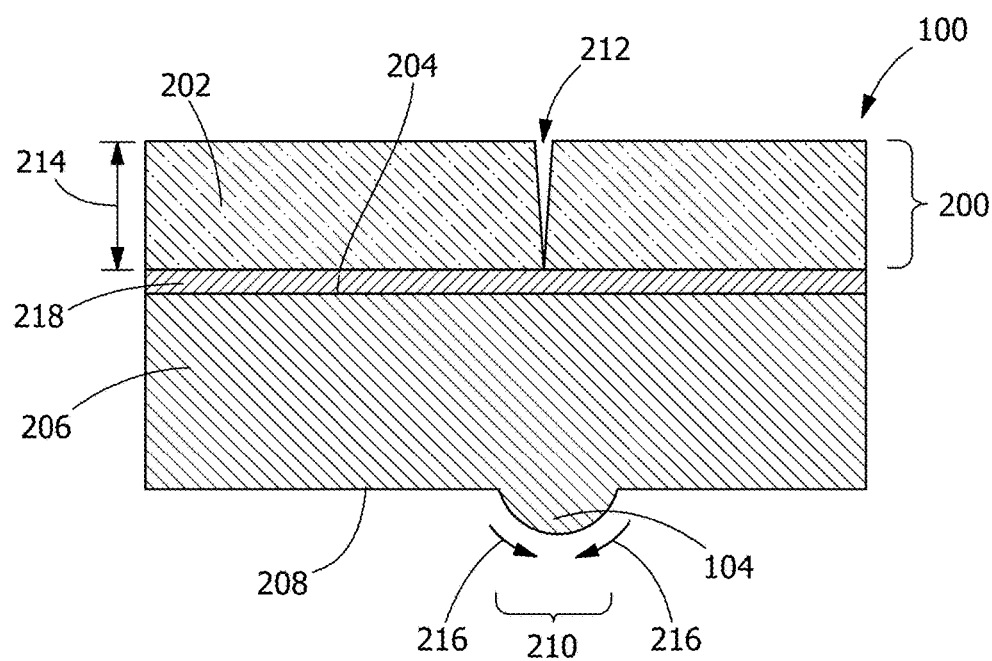
FIG. 2 is a sectional view along lines 2-2 of the article of FIG. 1, according to an embodiment of the present disclosure.
Figure 3:
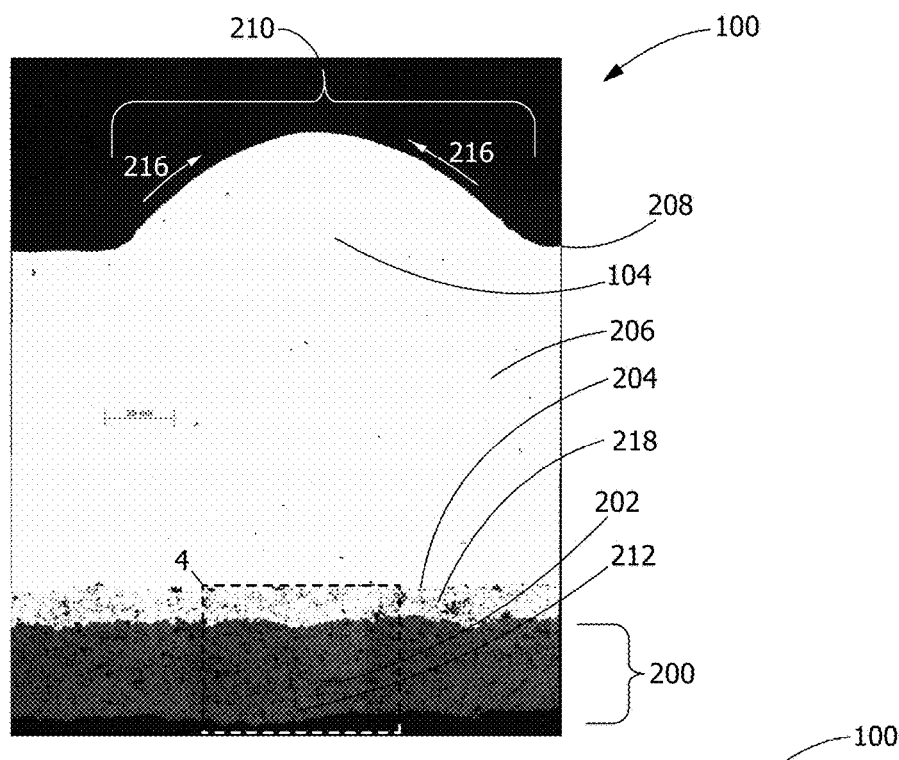
FIG. 3 is a micrograph corresponding to the section view of FIG. 1, according to an embodiment of the present disclosure.
Figure 4:
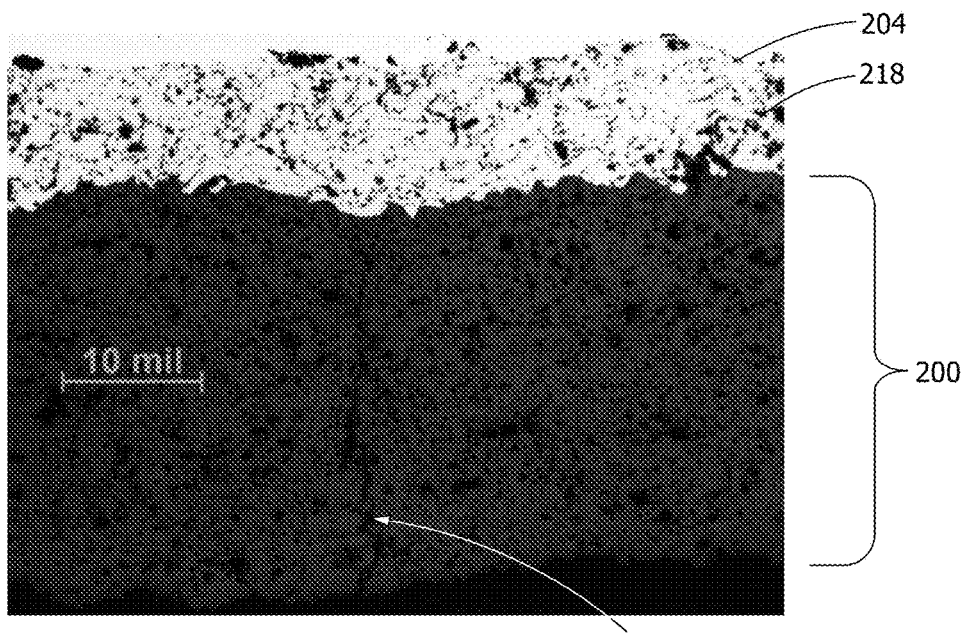
FIG. 4. is an expanded view of section 4 of the micrograph of FIG. 3, according to an embodiment of the present disclosure.

Referring to FIGS. 1-4, in one embodiment, a method for forming a vertically cracked thermal barrier coating 200 includes positioning an article 100 relative to a heat source 102. The article 100 includes a thermal barrier coating 202 disposed on a first surface 204 of a substrate 206, and the substrate 206 includes a second surface 208 distal across the substrate 206 from the first surface 204. Heat is applied locally to at least one discrete portion 210 of the second surface 208 of the substrate 206. At least one vertical crack 212 in the thermal barrier coating 202 is formed disposed over the at least one discrete portion 210, forming the vertically cracked thermal barrier coating 200 disposed on the substrate.

In one embodiment, the thermal barrier coating 202 is a low density thermal barrier coating 202, including a density of less than 85% of a theoretical density for the thermal barrier coating 202, alternatively less than about 80%, alternatively less than about 75%, alternatively less than about 70%, alternatively less than about 65%, alternatively less than about 60%, alternatively less than about 55%, alternatively less than about 50%, alternatively less than about 45%, alternatively less than about 40%, alternatively less than about 35%, alternatively less than about 30%, alternatively between about 25% to 85%, alternatively between about 30% to about 80%, alternatively between about 35% to about 75%, alternatively between about 40% to about 70%. As used herein, the theoretical density refers to the maximum density theoretically achievable for the thermal barrier coating 202.

In another embodiment, forming the vertically cracked thermal barrier coating 200 includes forming a selective crack distribution wherein the at least one vertical crack 212 is present in a first region 108 of the thermal barrier coating 202, and a second region 110 of the thermal barrier coating 202 is essentially free of vertical cracks 212. As used herein, essentially free of vertical cracks 212 allows for the presence of imperfections and de minimus cracks of less than about 25% of the thickness 214 of the thermal barrier coating 202 within the thermal barrier coating 202.

In yet another embodiment, the thermal barrier coating 202 is a low density thermal barrier coating 202 and includes a selective crack distribution.

The heat source 102 may be any suitable source capable of generating a localized heat increase in the substrate 206 at the discrete portion 210, provided that the localized heat increase in heat is sufficient to cause cooling-induced shrinkage in the discrete portion 210 when the discrete portion 210 cools following termination of the localized heat increase. In one embodiment, the heat source 102 provides sufficient thermal energy to the discrete portion 210 to form a molten pool on the second surface 208 of the substrate 206 with a thermal barrier coating 202 being disposed on the first surface 204 of the substrate 206. In a further embodiment, the molten pool does not penetrate to the first surface 204.

In one embodiment, the heat source 102 is a welding device. The welding device may be any suitable welding device, including, but not limited to, a gas tungsten arc welding torch, a gas metal arc welding torch, a laser source, an electron beam source, a plasma welding torch, a hybrid welding apparatus, a tribrid welding apparatus or combinations thereof. Applying the heat locally may include welding the at least one discrete portion 210 of the second surface 208 of the substrate 206. The welding may include any suitable technique, including, but not limited to, gas tungsten arc welding, gas metal arc welding, laser welding, electron beam welding, plasma welding, hybrid welding, tribrid welding, or combinations thereof.

Applying the welding technique to the at least one discrete portion 210 may include forming a weld bead 104, a weld turbulator 106, or a weld repair (not shown), or may proceed without adding material such that the at least one discrete portion 210 lacks a weld bead 104 and a weld turbulator 106. A weld turbulator 106 may be any feature which increases cooling of the article 100 by disrupting laminar flow of a fluid.

In one embodiment, applying the welding technique to the at least one discrete portion 210 produces weld shrinkage 216 at the at least one discrete portion 210, and the weld shrinkage forms the at least one vertical crack 212. The weld shrinkage may occur in a weld bead 104, a weld turbulator 106, a weld repair, or may occur in the substrate 206 itself, in particular in an embodiment in which the substrate 206 is subjected to local heating sufficient to generate weld shrinkage upon cooling without formation of a weld bead 104 or weld turbulator 106.

The at least one vertical crack 212 may extend through less than the thickness 214 of the thermal barrier coating 202, or it may extend through the entire thickness 214 of the thermal barrier coating 202. In one embodiment, the at least one vertical crack 212 does not penetrate into the substrate 206.

In one embodiment, a bond coat 218 is disposed between the first surface 204 of the substrate 206 and the thermal barrier coating 202. The bond coat 218 may include any suitable material, including, but not limited to, an MCrAlY, a NiCrAlY, an aluminide diffusion coating, a chromide diffusion coating, or combinations thereof. In a further embodiment, the at least one vertical crack 212 does not penetrate into the bond coat 218.

The substrate 206 may include any suitable composition, including, but not limited to, a superalloy, a refractory alloy, a nickel-based superalloy, a cobalt-based superalloy, an iron-based superalloy, an iron-based alloy, a steel alloy, a stainless steel alloy, a cobalt-based alloy, a nickel-based alloy, a titanium-based alloy, a titanium aluminide, or combinations thereof.

The thermal barrier coating 202 may include any suitable material, including, but not limited to, rare-earth stabilized zirconia, yttria-stabilized zirconia, alumina, or combinations thereof.

The thermal barrier coating 202 may applied to the substrate 206, with or without a bond coat 218 disposed between the thermal barrier coating 202 and the substrate 206, by any suitable method, including, but not limited to, thermal spray, air plasma spray, high velocity oxygen fuel thermal spray, high velocity air fuel spray, vacuum plasma spray, cold spray, or combinations thereof.

The article 100 may be any suitable article, including, but not limited to, an article including sheet metal, a turbine component, a combustion liner, and combinations thereof. In one embodiment, wherein the article 100 is a turbine component, and the turbine component is a combustion liner, the first surface 204 is an inner surface of the combustion liner, and the second surface 208 is an outer surface of the combustion liner.

In one embodiment, the method for forming a vertically cracked thermal barrier coating 200 is performed with an article 100 which has not been exposed to operating conditions, for example, the operating conditions for a gas turbine. In another embodiment, the method for forming a vertically cracked barrier coating 200 is performed on an article which has been exposed to operating conditions, for example, the operating conditions of a gas turbine. The operating conditions may include exposure to temperatures that exceed about 2,300° F., exposure to corrosive conditions, exposure to erosive conditions, exposure to combustion products, or combinations thereof. In one embodiment, the method is performed without any stripping of the thermal barrier coating 202 during a service period throughout which the article 100 is not subjected to operating conditions, and throughout which the operation of an apparatus (not shown) including the article 100 is suspended. The article 100 may be removed partially or completely from the apparatus during the service period, or the article 100 may remain in place in the apparatus during the service period.

In one embodiment, the at least one vertical crack 212 in the thermal barrier coating 202 is formed without a vacuum furnace.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for forming a vertically cracked thermal barrier coating, comprising:
    positioning an article relative to a heat source, the article including a thermal barrier coating disposed on a first surface of a substrate, the substrate including a second surface distal across the substrate from the first surface;
    applying heat locally to at least one discrete portion of the second surface of the substrate; and
    forming at least one vertical crack in the thermal barrier coating disposed over the at least one discrete portion.

2. The method of claim 1, wherein the thermal barrier coating is a low density thermal barrier coating including a density of less than 85% of a theoretical density for the thermal barrier coating.

3. The method of claim 1, wherein forming the vertically cracked thermal barrier coating includes forming a selective crack distribution wherein the at least one vertical crack is present in a first region of the thermal barrier coating, and a second region of the thermal barrier coating is free of vertical cracks.

4. The method of claim 1, wherein applying heat locally includes applying a welding technique to the at least one discrete portion of the second surface of the substrate.

5. The method of claim 4, wherein applying the welding technique to the at least one discrete portion includes forming at least one of a weld bead, a weld turbulator, and a weld repair.

6. The method of claim 4, wherein applying the welding technique to the at least one discrete portion produces weld shrinkage at the at least one discrete portion, the weld shrinkage forming the at least one vertical crack.

7. The method of claim 1, wherein the thermal barrier coating has a thickness, and the at least one vertical crack extends through less than the thickness of the thermal barrier coating.

8. The method of claim 1, wherein the thermal barrier coating has a thickness, and the at least one vertical crack extends through the entire thickness of the thermal barrier coating.

9. The method of claim 1, wherein a bond coat is disposed between the first surface of the substrate and the thermal barrier coating, and the at least one vertical crack does not extend into the bond coat.

10. The method of claim 1, wherein the substrate includes a composition selected from the group consisting of a superalloy, a refractory alloy, a nickel-based superalloy, a cobalt-based superalloy, an iron-based superalloy, an iron-based alloy, a steel alloy, a stainless steel alloy, a cobalt-based alloy, a nickel-based alloy, a titanium-based alloy, a titanium aluminide, and combinations thereof.

11. The method of claim 1, wherein the thermal barrier coating includes a material selected from the group consisting of rare-earth stabilized zirconia, alumina, and combinations thereof.

12. The method of claim 1, wherein the article is selected from the group consisting of an article including sheet metal, a turbine component, a combustion liner, and combinations thereof.

13. The method of claim 12, wherein the article is a turbine component, the turbine component being a combustion liner, the first surface is an inner surface of the combustion liner, and the second surface is an outer surface of the combustion liner.

14. The method of claim 12, wherein applying heat locally includes welding the at least one discrete portion of the second surface of the substrate, forming a weld turbulator.

15. The method of claim 1, wherein the method is performed without any stripping of the thermal barrier coating.

16. The method of claim 1, wherein the at least one vertical crack in the thermal barrier coating is formed without a vacuum furnace.

17. A method for forming a vertically cracked thermal barrier coating on a turbine component, comprising:
    positioning the turbine component relative to a welding device, the turbine component including a thermal barrier coating disposed on a first surface of a substrate, the substrate including a second surface distal across the substrate from the first surface;
    welding at least one discrete portion of the second surface of the substrate, producing weld shrinkage at the at least one discrete portion; and
    forming by the weld shrinkage at least one vertical crack in the thermal barrier coating disposed over the at least one discrete portion.

18. The method of claim 2, wherein the density of the low density thermal barrier coating is between about 40% to about 70% of the theoretical density for the thermal barrier coating.

19. The method of claim 1, wherein applying heat locally to the at least one discrete portion of the second surface of the substrate includes forming a molten pool on the second surface of the substrate.

20. The method of claim 19, wherein the molten pool does not penetrate to the first surface.

\* \* \* \* \*